US010546334B2

(12) United States Patent
Fujita et al.

(10) Patent No.: US 10,546,334 B2
(45) Date of Patent: Jan. 28, 2020

(54) INFORMATION PROCESSING APPARATUS, INFORMATION PROCESSING METHOD, AND PROGRAM

(71) Applicant: Rakuten, Inc., Setagaya-ku, Tokyo (JP)

(72) Inventors: Takafumi Fujita, Setagaya-ku (JP); Yoovraj Shinde, Setagaya-ku (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 619 days.

(21) Appl. No.: 15/126,851

(22) PCT Filed: Mar. 19, 2014

(86) PCT No.: PCT/JP2014/057447
§ 371 (c)(1),
(2) Date: Sep. 16, 2016

(87) PCT Pub. No.: WO2015/140947
PCT Pub. Date: Sep. 24, 2015

(65) Prior Publication Data
US 2017/0091857 A1 Mar. 30, 2017

(51) Int. Cl.
*G06Q 30/00* (2012.01)
*G06Q 30/06* (2012.01)
*G06Q 30/08* (2012.01)

(52) U.S. Cl.
CPC ......... *G06Q 30/0609* (2013.01); *G06Q 30/06* (2013.01); *G06Q 30/0601* (2013.01);
(Continued)

(58) Field of Classification Search
CPC ............... G06Q 30/08; G06Q 30/0631; G06Q 30/0609; G06Q 30/0613; G06Q 30/0621;
(Continued)

(56) References Cited

U.S. PATENT DOCUMENTS 6,317,722 B1 * 11/2001 Jacobi ................. G06Q 30/02
705/14.51
7,143,052 B2 * 11/2006 LaSalle ............... G06Q 10/063
705/7.33
(Continued)

FOREIGN PATENT DOCUMENTS

JP 2007-141135 A 6/2007
JP 2008-102846 A 5/2008
(Continued)

OTHER PUBLICATIONS

Ubiquitous recommender systems, by Christos Mettouris and George A. Papadopoulos, Computing, 96: 223-257 (2014) (Year: 2014).*
(Continued)

*Primary Examiner* — Anne M Georgalas
(74) *Attorney, Agent, or Firm* — Sughrue Mion, PLLC (57) ABSTRACT

A computer architecture stores favorite information showing a relationship between sellers and buyers who mark the sellers as favorite in a buy/sell web site, and similarity information regarding similarity between items/service sold and items/service bought. If the architecture receives action information showing a predetermined action from a first buyer to a first seller, it extracts second sellers that are marked as favorite by second buyers who mark the first seller as favorite, calculates a similarity and extracts at least one third seller who is marked as favorite by the second buyer having a similarity between the second seller and the first seller at a predetermined value or having a similarity between the first buyer and the second buyer at the predetermined value or more. Third seller recommendation information is transmitted to the first buyer.

10 Claims, 6 Drawing Sheets

(52) U.S. Cl.
CPC ..... *G06Q 30/0613* (2013.01); *G06Q 30/0621* (2013.01); *G06Q 30/0631* (2013.01); *G06Q 30/0641* (2013.01); *G06Q 30/08* (2013.01)

(58) Field of Classification Search
CPC . G06Q 30/0641; G06Q 30/06; G06Q 30/0601
See application file for complete search history.

(56) References Cited

U.S. PATENT DOCUMENTS

| | | | | |
|---|---|---|---|---|
| 7,464,051 | B1* | 12/2008 | Heggem | G06Q 30/02 705/26.2 |
| 7,502,757 | B2* | 3/2009 | Schmidt | G06Q 30/08 705/37 |
| 8,751,427 | B1* | 6/2014 | Mysen | H04L 67/306 706/46 |
| 9,756,458 | B1* | 9/2017 | Chein | H04L 67/306 |
| 9,767,485 | B2* | 9/2017 | Sotomayor | G06Q 30/0261 |
| 2008/0255977 | A1* | 10/2008 | Altberg | G06Q 30/02 705/35 |
| 2009/0204547 | A1* | 8/2009 | Rowan | G06Q 30/06 705/80 |
| 2010/0153292 | A1* | 6/2010 | Zheng | G06O 30/02 705/347 |
| 2011/0029403 | A1* | 2/2011 | Xu | G06Q 30/00 705/26.7 |
| 2013/0144674 | A1* | 6/2013 | Kim | G06Q 30/0207 705/7.19 |
| 2013/0332469 | A1 | 12/2013 | Nakamura et al. | |
| 2014/0046792 | A1* | 2/2014 | Ganesan | G06Q 30/0611 705/26.4 |
| 2014/0052576 | A1* | 2/2014 | Zelenka | G06Q 30/00 705/26.41 |

FOREIGN PATENT DOCUMENTS

| | | |
|---|---|---|
| JP | 2009-123192 A | 6/2009 |
| JP | 2013-254288 A | 12/2013 |
| JP | 2014-2492 A | 1/2014 |

OTHER PUBLICATIONS

International Search Report of the International Searching Authority for PCT/JP2014/057447 dated Jun. 10, 2014 [PCT/ISA/210].

\* cited by examiner

INFORMATION PROCESSING APPARATUS, INFORMATION PROCESSING METHOD, AND PROGRAM

CROSS REFERENCE TO RELATED APPLICATIONS

This application is a National Stage of International Application No. PCT/JP2014/057447, filed on Mar. 19, 2014, the contents of all of which are incorporated herein by reference in their entirety.

TECHNICAL FIELD

The present invention relates to an information processing apparatus that can provide service of buying and selling items such as an auction site on the Internet, an information processing method and a program used in the information processing apparatus.

BACKGROUND ART

In a system for buying and selling items such as an auction system, a user as a buyer may mark a user as a seller as favorite. For example, a bidder in an auction system marks as favorite a seller of items successfully bidded and a seller who sells items of favorite.

In addition to the self favorite by the user, there is a technology that the system may recommend other user who is favorited by the user.

Patent Document 1 below describes that one user is recommended to another user if both users give highest points and lowest points to the same items or service to be evaluated.

Patent Document 1: Japanese Patent Application Laid-open No. 2009-123192

SUMMARY OF INVENTION

Problems to be Solved by the Invention

By the technology described in Patent Document 1, the user is recommended under the extremely limited condition that the subjects to be evaluated having highest points and lowest points are common. Even if the favorite items or service of the one user and the other user are very close, the other user is not recommend as long as the unfavorite items or service are not common. It means that by the technology of interest opportunities for buying the items or service by the user may be undesirably lost, as the other user having the favorite matched with the user is not recommended.

By the technology described in Patent Document 1, when the other user to be recommended is selected for one user, the server has to analyze all subjects to be evaluated having highest points and lowest points evaluated by the other user, which is undesirable in that a processing load of the server is great.

By the technology described in Patent Document 1, the other user recommended to one user is always the user as the buyer similar to the one user. It does not correspond to match the user as the buyer with the user as the seller, for example, in a net auction system.

In view of the circumstances as described above, an object of the present invention is to provide an information processing apparatus, an information processing method, and a program that it is possible to recommend sellers having high possibilities who are interested by buyers while a processing load is alleviated in a system for buying and selling items.

Means for Solving the Problems

For attaining the object described above, according to the present invention, there is provided an information processing apparatus, including a storage unit; a communication unit; and a control unit. The storage unit stores favorite information showing a relationship between selling users and buying users who mark the selling users as favorite in a buy and sell web site of items or service, and similarity information regarding similarity between items or service sold by the selling users and items or service bought by the buying users. The communication unit may be communicated with terminals of the selling users and terminals of the buying users. If the communication unit receives action information showing a predetermined action from a first buying user to a first selling user via the buy and sell web site from a terminal of a first buying user, the control unit may extract second selling users that are marked as favorite by second buying users who mark the first selling user as favorite based on the favorite information. The control unit may calculate a similarity between the first buying user and the second buying users or a similarity between the first selling user and the second selling users based on the similarity information. The control unit may extract at least one third selling user from the extracted second selling users having a similarity between the first selling user and the second selling users at a predetermined value or more or who are marked as favorite by the second buying users having a similarity between the first buying user and the second buying users at the predetermined value or more. The control unit may control the communication unit such that web pages including recommendation information that recommends the third selling user is transmitted to the terminal of the first buying user.

In this manner, the information processing apparatus may recommend the sellers having high possibilities who are interested by the buying users while parameters of recommendation candidates are narrowed down and a processing load is alleviated by filtering the second selling users marked as favorite by the second buying users who mark the first selling user as favorite.

The control unit may generate a web page including a list of display fields for the recommendation information displayable by the terminal of the first buying user such that the higher a similarity between the first selling user and the second selling users or a similarity between the first buying user and the second buying users is, the more display fields of the recommendation information of the third selling users who are recommended based on the similarity are displayed preferentially within the list.

In this manner, the information processing apparatus recommends the selling users having high possibilities who are interested by the buying users, thereby activating actions of the buying users thereafter. Herein, "displaying preferentially" refers that areas of the display fields for the recommendation information are set great or positions of the display fields are set upward, but it does not limited thereto.

The display lists may include images showing items sold by the third selling users. In this case, the control unit may generate the web page such that the higher the similarity between the first selling user and the second selling users or the similarity between the first buying user and the second buying users is, the more the number of images showing items of the third selling users who are recommended based on the similarity is.

In this manner, the information processing apparatus allows the buying user's eyes to attract the items of the sellers having high possibilities who are interested by the buying users, thereby activating actions of the buying users.

The display fields for the recommendation information may include at least one image showing an items sold by the third selling user. In this case, the control unit may generate the web page such that an image of an item other than the item bought by the first buying user is included as an image.

In this manner, the information processing apparatus excludes the images of the items already bought by the buying users from displaying, thereby increasing the possibilities for buying the items of the buying users.

The control unit may generate the web page such that if the similarity between the first buying user and the second buying users or the similarity between the first selling user and the second selling users is same regarding a plurality of the third selling users extracted, the numbers of the buying users who mark a plurality of the third selling users as favorite are compared, and the display fields of the recommendation information of the third selling users who are marked by more buying users are displayed preferentially within the list.

In this manner, the information processing apparatus can recommend preferentially the buying users who are supported by more buying users.

According to other embodiment of the present invention, there is provided an information processing method, including:

storing favorite information showing a relationship between selling users and buying users who mark the selling users as favorite in a buy and sell web site of items or service, and similarity information regarding similarity between the items or service sold by the selling users and the items or service bought by the buying users;

extracting, if the communication unit receives action information showing a predetermined action from a first buying user to a first selling user via the buy and sell web site from a terminal of the first buying user, second selling users that are marked as favorite by second buying users who mark the first selling user as favorite based on the favorite information;

calculating a similarity between the first buying user and the second buying users or a similarity between the first selling user and the second selling users based on the similarity information;

extracting at least one third selling user from the extracted second selling users having a similarity between the first selling user and the second selling users at a predetermined value or more or who are marked as favorite by the second buying users having a similarity between the first buying user and the second buying users at the predetermined value or more; and transmitting a web page including recommendation information that recommends the third selling user to the terminal of the first buying user.

According to other embodiment of the present invention, there is provided a program that causes a computer to execute a method of:

storing favorite information showing a relationship between selling users and buying users who mark the selling users as favorite in a buy and sell web site of items or service, and similarity information regarding similarity between the items or service sold by the selling users and the items or service bought by the buying users;

extracting, if the communication unit receives action information showing a predetermined action from a first buying user to a first selling user via the buy and sell web site from a terminal of the first buying user, second selling users that are marked as favorite by second buying users who mark the first selling user as favorite based on the favorite information;

calculating a similarity between the first buying user and the second buying users or a similarity between the first selling user and the second selling users based on the similarity information;

extracting at least one third selling user from the extracted second selling users having a similarity between the first selling user and the second selling users at a predetermined value or more or who are marked as favorite by the second buying users having a similarity between the first buying user and the second buying users at the predetermined value or more; and transmitting a web page including recommendation information that recommends the third selling user to the terminal of the first buying user.

As described above, according to the present invention, the sellers having high possibilities who are interested by the buying users can be recommended while the processing load is alleviated in an item buying and selling system. However, the advantages described herein are not necessarily limit the present invention.

MODES FOR CARRYING OUT THE INVENTION

Hereinafter, embodiments of the present invention applied to the auction system will be specifically described with reference to the drawings.

[Configuration of System]

Figure 1:
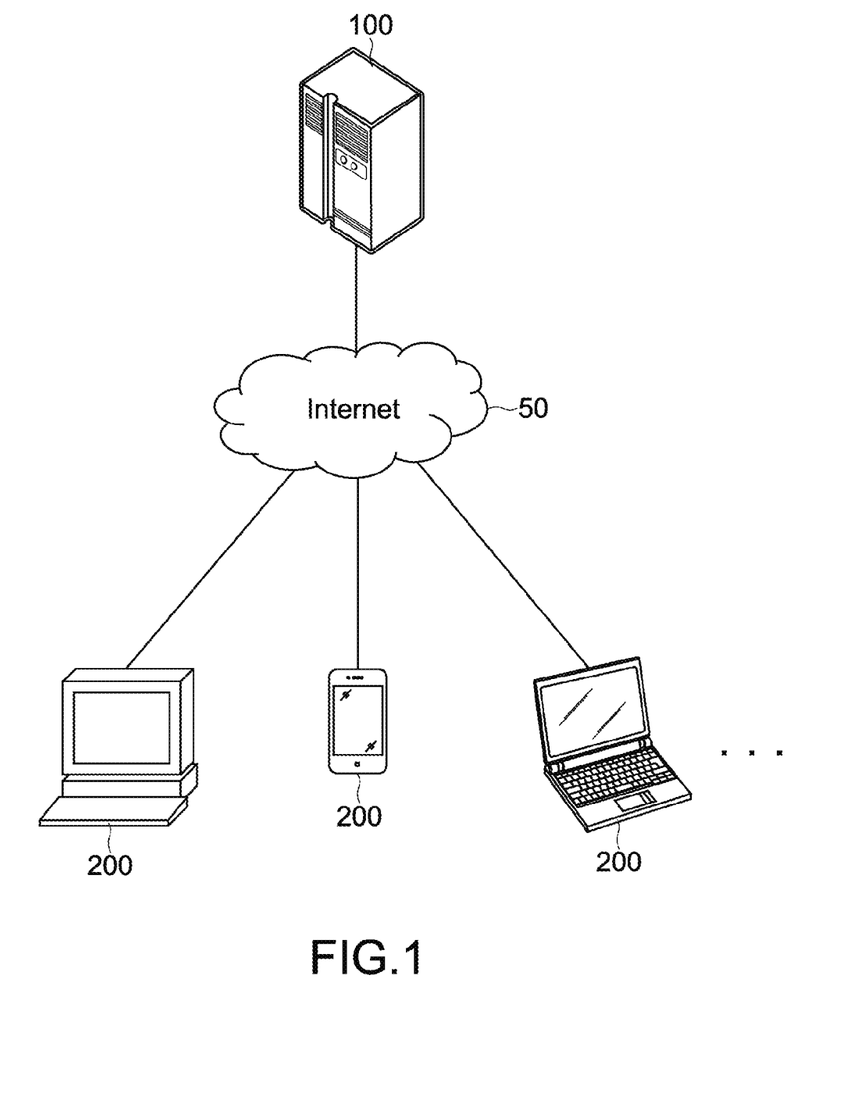
FIG. 1 A diagram showing a configuration of an auction system according to an embodiment of the present invention.

FIG. 1 is a diagram showing a configuration of an auction system according to an embodiment of the present invention.

As shown in FIG. 1, the system includes an auction server 100 on the Internet 50 and a plurality of user terminals 200.

The auction server 100 is managed by an auction site manager, and is connected to the user terminals 200 via the Internet 50.

The user terminal 200 is used by a user capable of participating an auction, and is a smartphone, a mobile phone, a table PC (Personal Computer), a notebook PC, a desk top PC, and the like, for example.

The auction server 100 generates a web page (HTML (Hyper Text Markup Language) document including a variety of information items regarding items put at an auction in response to an access request from the user terminal 200, and sends it back to the user terminal 200.

The user terminal 200 access the auction server 100, receives the web page, and displays a screen of a browser.

The user of the user terminal 200 may put an item on the auction as a seller, or may bid for an item on the auction as a bidder via the screen displayed by the browser.

In other words, the user may be the seller or the bidder. However, in many cases, the user tends to either sell or bid. In the embodiment of the present invention, the user who tends to sell is called as a seller (selling user) and the user who tends to bid is called as a bidder (bidder user).

In the auction system, the bidder may mark a favorite seller such as the seller who sells a favorite item from the past bid or successful bid to the auction server 100 via the user terminal 200.

As described later, the auction server 100 may recommend other seller who will be interested by the bidder of interest, when the bidder takes a predetermined action such as favorite registration to a certain seller.

[Hardware Configuration of Auction Server]

Figure 2:
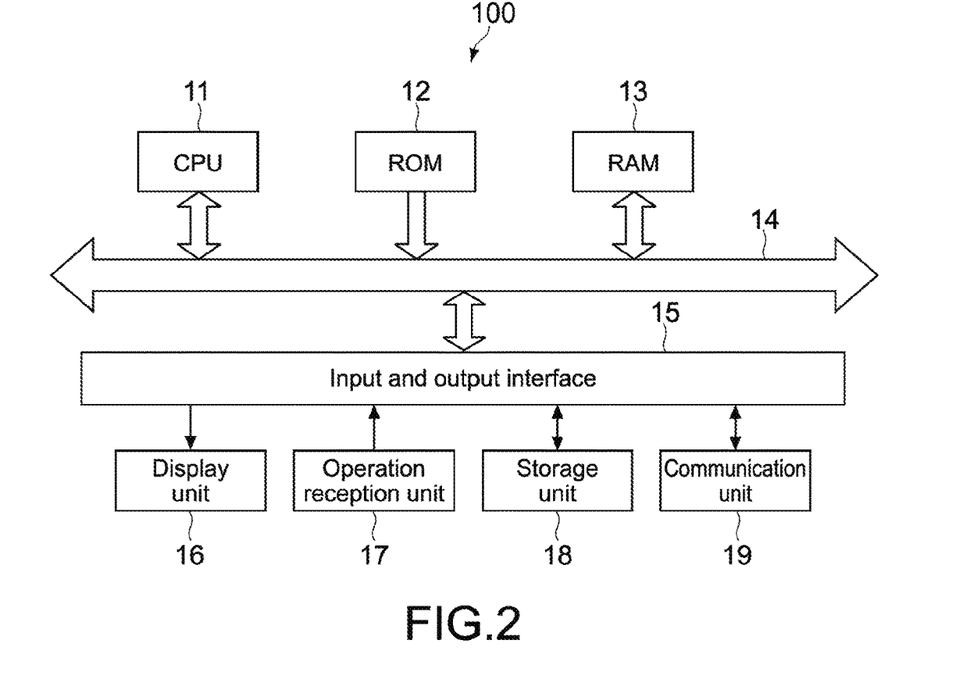
FIG. 2 A diagram showing a hardware configuration of an auction server in the system.

FIG. 2 is a diagram showing a hardware configuration of the auction server 100. As shown in FIG. 2, the auction server 100 includes a CPU (Central Processing Unit) 11, a ROM (Read Only Memory) 12, a RAM (Random Access Memory) 13, an input and output interface 15, and a bus 14 for connecting these components.

The CPU 11 accesses the RAM 13 etc. appropriately as necessary, performs various arithmetic processing, and totally and integratedly controls each block of the auction server 100. The ROM 12 is a non-volatile memory where firmware such as an OS, a program and a variety or parameters executed by the CPU 11 is stationary stored. The RAM 13 is used for a work space of the CPU 11, and temporary holds the OS, a variety of applications under execution, and a variety of data under processing.

To the input and output interface 15, a display unit 16, an operation reception unit 17, a storage unit 18, a communication unit 19 and the like are connected.

The display unit 16 is a display device such as an LCD (Liquid Crystal Display), an OELD (Organic Electro Luminescence Display), a CRT (Cathode Ray Tube) and the like.

The operation reception unit 17 is an input device such as a pointing device, e.g., a mouse, a keyboard, a touch panel, and others. If the operation reception unit 17 is a touch panel, the touch panel may be integrated with the display unit 16.

The storage unit 18 is a non-volatile memory such as an HDD (Hard Disk Drive), a flash memory (SSD: Solid State Drive), and other solid memory. The storage unit 18 stores the OS, a variety of the applications, and a variety of the data as described above.

As described later, in particular, in the embodiment of the present invention, the storage unit 18 includes a selling information database, a bidding information database, a favorite registration information database, and a similarity information database.

The communication unit 19 is an NIC (Network Interface Card) for the Ethernet, and is responsible for communication processing between the auction server 100 and the user terminals 200.

[Database Configuration of Auction Server]

Figure 3:
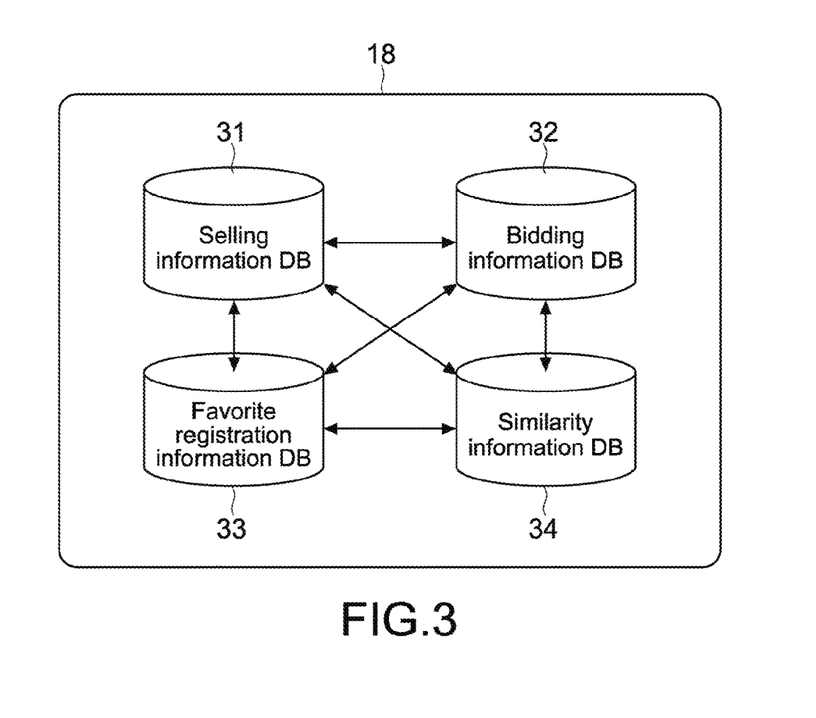
FIG. 3 A diagram showing a configuration of database belonging to the auction server.

FIG. 3 is a diagram showing a database configuration included in the auction server 100.

As shown in FIG. 3, the auction server 100 includes a selling information database 31, a bidding information database 32, a favorite registration information database 33, and a similarity information database 34 in the storage unit 18.

The selling information database 31 stores information including seller information such as a user name and a contact address of a seller, an auction ID of an auction held by a seller, and an item ID, an item name, an item description text, an item image and a manufacture's name of an item put at the auction.

The bidding information database 32 stores information including bidder information such as a user name and a contact address of a bidder, an auction ID of an auction participated by the bidder, and an item ID, an item name and a manufacture's name of an item bidded or successfully bidded.

The favorite registration information database 33 stores information including bidder information about one seller who is marked as favorite (including the number of the bidders who mark the seller as favorite), and seller information marked as favorite for each bidder (including the number of the sellers who are marked as favorite by each bidder).

Here, according to the embodiment of the present invention, from a certain seller's point of view, the user who marks the seller as favorite may be called as a "fan".

The similarity information database 34 stores information showing a similarity between an item to be sold by a seller and an item bidded by a bidder (or successfully bidded by a bidder). The similarity is calculated based on meta data including an item category, an item name and a manufacture's name.

Each database is used when the auction server 100 recommends a seller for a bidder as described later.

[Operation of Auction Server]

Next, an operation of the auction server 100 configured as described above will be described. The operation is executed by cooperating hardware such as the CPU 11 and the communication unit 19 with software stored in the storage unit 18 in the auction server 100. In the description below, the CPU 11 is defined as a main operator as a matter of convenience.

Figure 4:
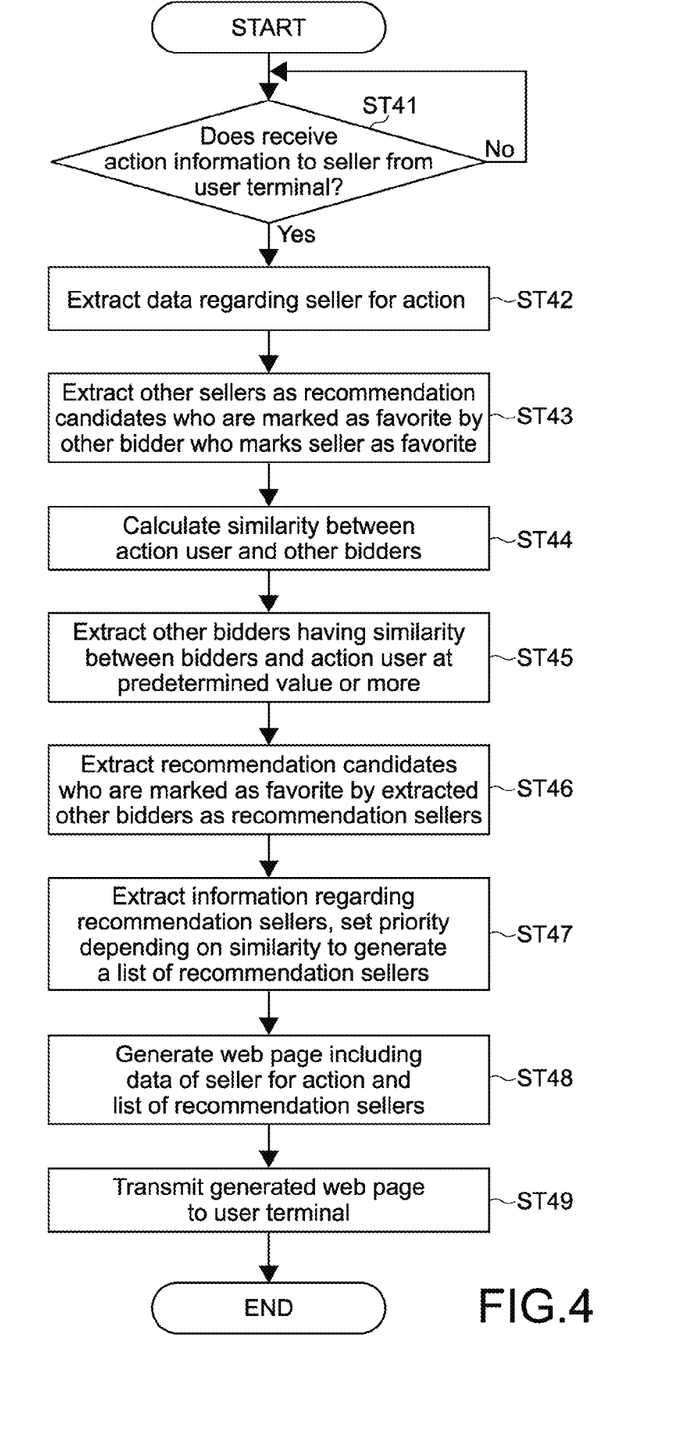
FIG. 4 A flow chart showing a flow of seller recommendation processing by the auction server.

FIG. 4 is a flow chart showing a flow of seller recommendation processing by the auction server 100.

As shown in FIG. 4, the CPU 11 in the auction server 100 determines whether or not request information showing an action to a seller is received from the user terminal 200 (Step 41). The user of the user terminal 200 who transmits the action request is hereinafter also called as an action user.

For example, the action to the seller is a request for marking the seller as favorite, but is not limited thereto. The request for marking as favorite is transmitted to the auction server 100 by depressing a button to "mark a person to favorite" by the user of the user terminal 200 in a specific auction page posted to the auction site or a seller's profile page linkable to an auction list page, for example.

If it is determined that the action information is received (Yes), the CPU 11 acquires data regarding the seller for the action from the selling information database 31 (Step 42).

Next, the CPU 11 extracts other sellers as recommendation candidates from the favorite registration information database 33. The other sellers are different from the seller for the action, and are marked as favorite by other users (bidders) who mark the seller for the action as favorite. In the extraction processing, other sellers who are already marked by the action user as favorite are excluded.

Next, the CPU 11 calculates the similarity between the action user and the other users (bidders) who mark the seller for the action as favorite referring to the similarity information database 34.

Next, the CPU 11 extracts the bidders having the similarity between the bidders and the action user at predetermined value or more from other bidders who mark the recommendation candidates (Step 45).

Next, the CPU 11 extracts the recommendation candidates who are marked as favorite by the extracted other bidders as recommendation sellers from the extracted recommendation candidates (Step 46).

Next, the CPU 11 acquires information regarding the extracted recommendation sellers from the selling information database 31, marks priority to the recommendation sellers depending on the similarity used for extracting the recommendation sellers, and generates a list of the recommendation sellers (Step 47).

Here, the priority is marked depending on the similarity such that the higher the similarity is, the higher order and greater a display frame of each recommendation seller in the list is or the greater number images of items to be sold by the recommendation seller displays, thereby generating the list. If the different recommendation sellers have the same similarity, the seller who is marked as favorite by more bidders (i.e., has more fans) has preference.

Next, the CPU 11 generates a web page including data of the seller for the action and the generated list of the recommendation sellers (Step 48).

Then, the CPU 11 transmits the generated web page to the user terminal 200 as a response page to the user action (Step 49).

Figure 5:
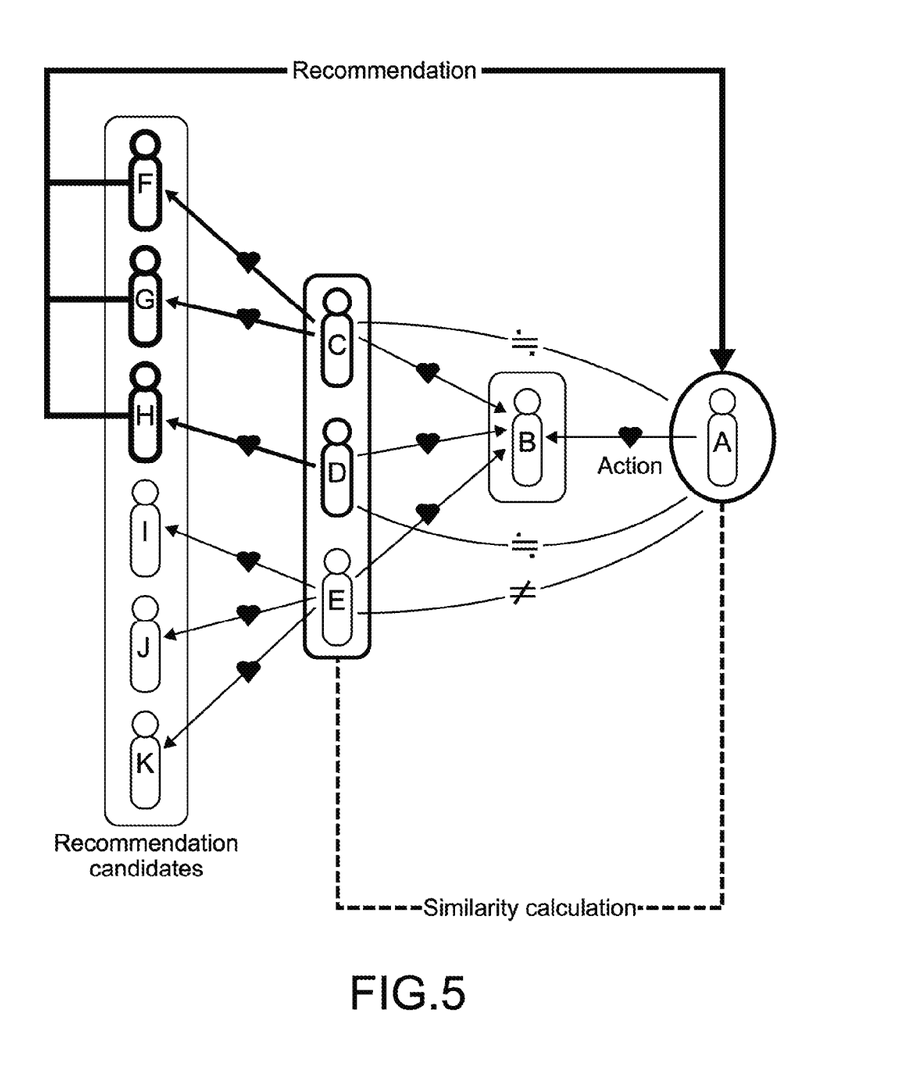
FIG. 5 A schematic diagram showing a relationship between the seller recommendation processing and each user.

FIG. 5 is a schematic diagram showing a relationship between the seller recommendation processing and each user.

As shown in FIG. 5, if an action user A takes an action to a user (seller) B, other users (sellers) F, G, H, I, J and K are extracted who are marked by other users (bidders) who mark the user B as favorite, i.e., who are marked by users C, D and E who are fans of the user B.

Then, the similarity between the users C, D and E and the action user A is calculated. The users C and D having the similarity at the predetermined value or more are extracted. Among the recommendation candidates, only the users F, G and H who are marked as favorite by the users C and D are recommended to the user A as the recommendation seller.

Figure 6:
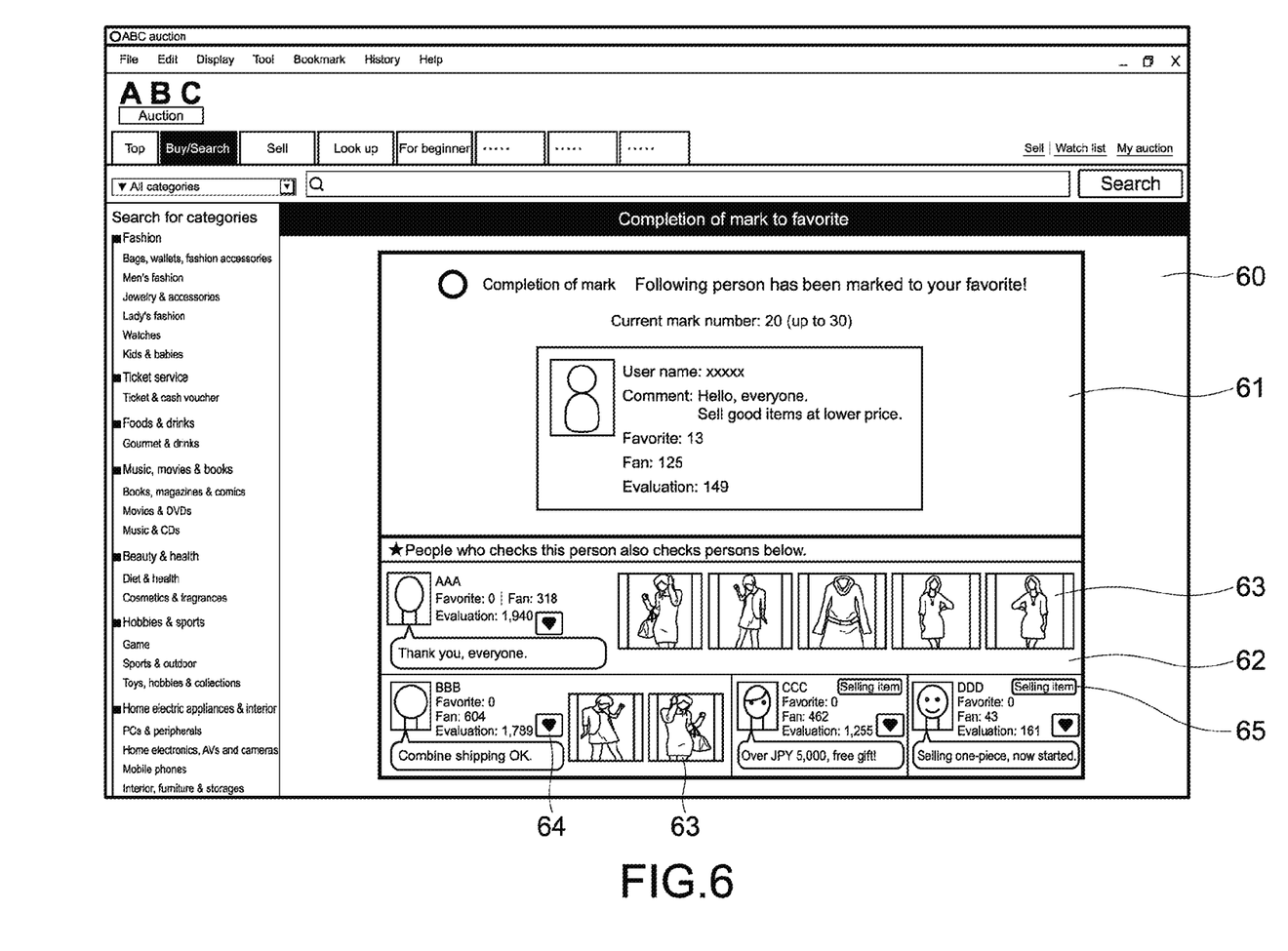
FIG. 6 A diagram showing an example of a web page including recommendation information generated by the auction server and displayed on a user terminal.

FIG. 6 is a diagram showing an example of the web page including the recommendation information generated by the auction server 100 and displayed on the user terminal 200.

If the user of the user terminal 200 press the button "mark a person to favorite" on the specific seller's profile page of the auction site, a page of completion of mark to favorite 60 shown in FIG. 6 is transmitted from the auction server 100 to the user terminal 200, and displayed on the user terminal 200.

As shown in FIG. 6, at an upper part of the page of completion of mark to favorite 60, a notification area 61 of completion of mark to favorite is displayed. On the notification area 61 of completion of mark to favorite, a message that the seller who is requested to be marked as favorite by the user is completed to be marked as favorite is displayed together with the profile information of the seller.

At a lower part of the notification area 61 of completion of mark to favorite, an area 62 for seller recommendation is displayed.

In the area 62 for seller recommendation, a list of the recommendation sellers extracted by the extraction processing based on the similarity at the predetermined value or more shown in FIGS. 5 and 6 is displayed for each display frame.

Within the display frame of each recommendation seller, the number of fans and evaluation values of the seller, item images 63 of items selling by the seller, and buttons 64 to mark the seller to favorite are displayed. The item images 63 are hyperlinked to an auction page under way where the items of the item images 63 are selling.

If the similarity is higher, the display frame of each recommendation seller is set to have a larger area and is displayed at the upper part. In the example shown in FIG. 6, a user "AAA" is a seller who is marked as favorite by other bidders having the highest similarity between the action user and the users.

The number of the item images 63 displayed within the display frame of each recommendation seller is set such that the more the item images 63 are displayed, the higher the similarity is. For example, within the display frame of the user "AAA", five item images 63 are displayed, but within the display frame of a user "BBB" left below, only two item images 63 are displayed. Within the respective display frames of users "CCC" and "DDD", no item image is displayed, buttons 65 for displaying selling items hyperlinked to the item images 63 are displayed instead.

When a plurality of the item images 63 is displayed, the item images 63 are randomly extracted. For example, the item images with high preference in relation to the item names of the action user, manufacturers, categories may be extracted based on similarity information DB34.

When the item images 63 are extracted, the auction server 100 excludes the item images 63 showing the items that the action user have been already successfully bidded based on the bidding information database 32.

According to the embodiment of the present invention, if the user (bidder) of the user terminal 200 takes an action to the specific seller, the auction server 100 may recommend other sellers having high possibilities who are interested by the action user while parameters of the recommendation candidates are narrowed down and the processing load is alleviated by filtering the action user and other sellers who are marked as favorite by other bidders who mark to favorite the specific sellers based on the similarity between the action user and other bidders of interest.

[Modification]

The present invention is not limited to the above-described embodiments, and various modifications and alterations may be made without departing from the scope and spirit of this invention.

In the above-described embodiments, the similarity between the action user (bidder) and the other users (sellers) who mark the seller for the action as favorite is calculated, and the recommendation sellers who are marked as favorite by other users having the similarity at the predetermined value or more between the action user and the sellers as the recommendation candidates among the recommendation candidates are presented. However, the similarity between the sellers for the action and the recommendation candidates may be calculated, and the recommendation sellers who have the similarity at the predetermined value or more between the sellers as the recommendation candidates among the recommendation candidates and the seller for the action may be presented.

Figure 7:
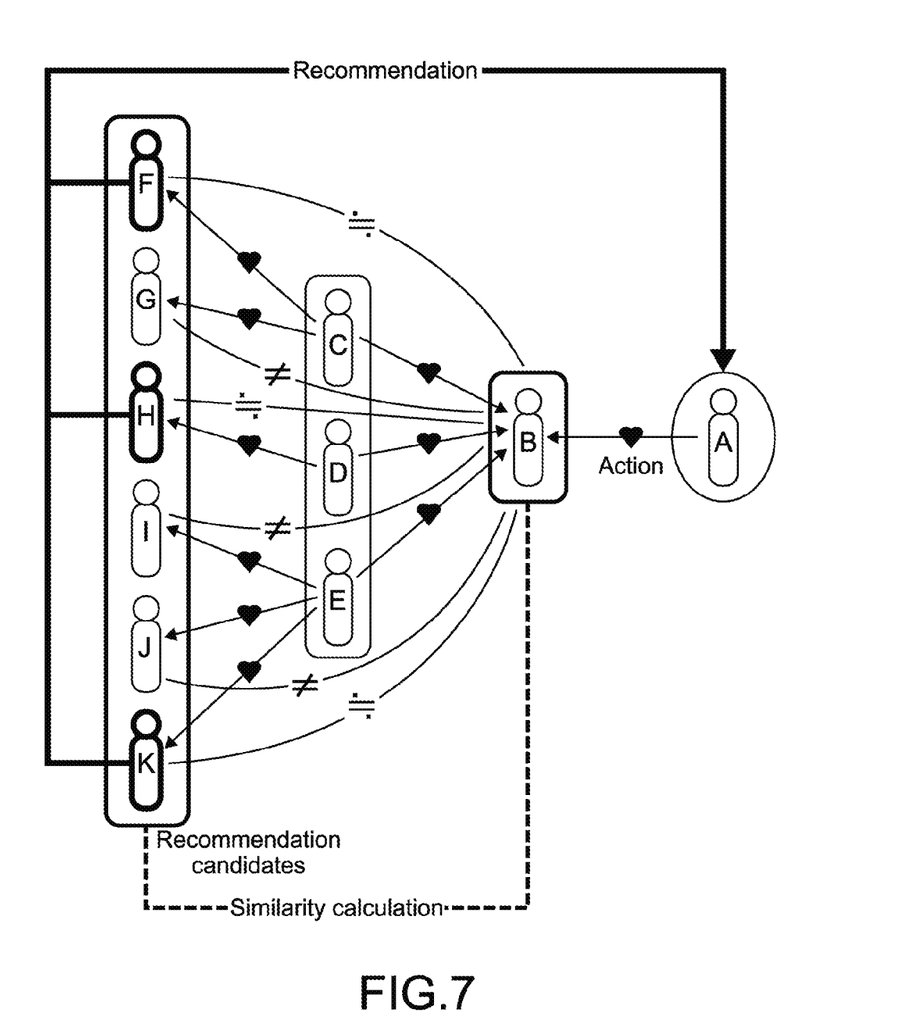
FIG. 7 A schematic diagram showing a relationship between seller recommendation processing and each user according to another embodiment of the present invention.

FIG. 7 is a schematic diagram showing a relationship between the recommendation processing and each user in this case. As shown in FIG. 7, if the action user A takes an action to the user (seller) B, other users (sellers) F, G, H, I, J and K are extracted as the recommendation candidates who are marked by other users (bidders) who mark the user B as favorite, i.e., who are marked by users C, D and E who are fans of the user B.

Then, the similarity between the users as the recommendation candidates F, G, H, I, J and K and the user B for the action is calculated. Among the recommendation candidates, only the users F, H and K having the similarity at the predetermined value or more are recommended to the user A as the recommendation sellers.

In summary, both of the similarity between the users who tend to sell and the similarity between the users who tend to bid can be used for narrowing the recommendation sellers as the similarity between the users having the same tendencies.

In this case, the area and the number of the item images 63 within the display frame of each recommendation seller in the area 62 for seller recommendation may be changed depending on the similarity between the sellers for the action and the recommendation candidates.

In the above-described embodiments, as the action by the user (bidder) to the seller that forms a trigger for recommending other sellers, the mark to favorite has been used. However, the action is not limited thereto. For example, a variety of the actions including a view request of the seller's profile information, an add request to a watch list (a list for registering an auction that the user does not bidded but is interested in) of one auction (item), and an evaluation addition request to the sellers may be used by the user as the trigger, and other sellers may be recommended in the same wave page together with response results to the actions.

In the above-described embodiments, the sellers who do not sell items for a predetermined period (for example, for several weeks, a month, or the like) may be excluded from the recommendation candidates. Similarly, the sellers having the evaluation values at the predetermined value or less or the minus evaluation values may be excluded based on evaluation information by other bidders. Furthermore, the sellers who are registered in a black list generated based on notification by the auction server from the user terminals of other bidders may be excluded.

In the above-described embodiments, the area and the number of the item images 63 within the display frame of each recommendation seller in the area 62 for seller recommendation are changed depending on the similarity between the action user and other users. However, if page views of a profile information page of the recommendation seller and a list page of the items to be sold exceed predetermined times, the number of the item images 63 may be limited or may not be displayed, or the buttons 65 for displaying the items to be sold hyperlinked to the item images may not be displayed, in consideration of the load to the auction server 100.

In the above-described embodiments, the present invention is applied to the auction system as an example. But, the present invention may be applied to other service such as an electronic mall. In other words, the present invention is generally applicable to a buying and selling system gone through by connecting a user as a possible buyer and a user as a possible seller to a server via the respective user terminals.

DESCRIPTION OF REFERENCE NUMERALS

11 CPU
18 storage unit
19 communication unit
31 selling information database
32 bidding information database
33 favorite registration information database
34 similarity information database
50 Internet
60 page of completion of mark to favorite
61 notification area of completion of mark to favorite
62 area for recommendation seller
63 item image
64 button
100 auction server
200 user terminal

The invention claimed is:

1. An information processing apparatus comprising:
a storage unit comprising one or more databases, wherein the one or more databases are configured to store favorite information showing a relationship between selling users and buying users who mark the selling users as favorite in a buy and sell web site of items or service, and similarity information regarding similarity between the items or service;
a communication unit comprising a network interface card, wherein the communication unit is configured to communicate with terminals of the selling users and terminals of the buying users;
at least one memory configured to store computer program code; and
at least one processor configured to access said at least one memory and operate according to said computer program code, said computer program code including:
first extracting code configured to cause at least one of the at least one processor to extract, when the communication unit receives action information showing a predetermined action from a first buying user to a first selling user and wherein the predetermined action is via the buy and sell web site from a terminal of the first buying user, second selling users that are each marked as favorites by second buying users, wherein the second buying users each marked the first selling user as a favorite,
calculating code configured to cause at least one of the at least one processor to calculate one or more first similarities between the first buying user and the second buying users wherein the one or more first similarities are calculated between first items or services bought by the first buying user and second items or services bought by the second buying users,
second extracting code configured to cause at least one of the at least one processor to extract at least one third selling user from the second selling users, wherein the at least one third selling user is marked as a favorite by a portion of the second buying users having one or more second similarities between the first buying user and the second buying users, and
controlling code configured to cause at least one of the at least one processor to control the communication unit to transmit a web page including recommendation information, wherein the recommendation information refers to the at least one third selling user, to the terminal of the first buying user, wherein the higher a third similarity between the at least one third selling user and the first buying user, the larger a display area associated with the at least one third selling user in the recommendation information.

2. The information processing apparatus according to claim 1,
wherein the controlling code is further configured to cause at least one of the at least one processor to generate the web page, wherein the web page includes a plurality of display fields for the recommendation information displayable by the terminal of the first buying user such that the higher the one or more first similarities between the first buying user and the second buying users, the higher is a number of the plurality of display fields.

3. The information processing apparatus according to claim 2,
wherein the display fields of the recommendation information include images showing items sold by the third selling user, and
wherein the controlling code is further configured to cause at least one of the at least one processor to generate the web page such that the higher the one or more first similarities between the first buying user and the second buying users, the greater a number of images are included in the recommendation information.

4. The information processing apparatus according to claim 3,
wherein an image of an item already
bought by the first buying user is excluded from the recommendation information.

5. The information processing apparatus according to claim 2,
wherein the controlling code is further configured to cause at least one of the at least one processor to generate the web page such that if the one or more first similarities between the first buying user and the second buying users are the same regarding a plurality of the third selling users extracted, the numbers of the second buying users who mark a plurality of the third selling users as favorite are compared, and a second plurality of display fields of the recommendation information of the third selling users who are marked by more second buying users are displayed preferentially within the plurality of display fields.

6. An information processing method, comprising:
storing, in one or more databases, favorite information showing a relationship between selling users and buying users who mark the selling users as favorite in a buy and sell web site of items or service, and similarity information regarding similarity between the items or service sold by the selling users and the items or service bought by the buying users;
receiving action information showing a predetermined action from a first buying user to a first selling user and wherein the predetermined action is via the buy and sell web site from a terminal of the first buying user;
extracting, responsive to the receiving, second selling users that are each marked as favorites by second buying users, wherein the second buying users each marked the first selling user as a favorite;
calculating one or more first similarities between the first buying user and the second buying users wherein the one or more first similarities are calculated between first items or services bought by the first buying user and second items or services bought by the second buying users;
extracting at least one third selling user from the second selling users, wherein the at least one third selling user is marked as a favorite by a portion of the second buying users having one or more second similarities between the first buying user and the second buying users; and
transmitting a web page including recommendation information, wherein the recommendation information refers to the at least one third selling user, to the terminal of the first buying user, wherein the higher a third similarity between the at least one third selling user and the first buying user, the larger a display area associated with the at least one third selling user in the recommendation information.

7. The information processing method according to claim 6, further comprising:
generating the web page, wherein the webpage includes a plurality of display fields for the recommendation information displayable by the terminal of the first buying user such that the higher the one or more first similarities between the first buying user and the second buying users, the higher is a number of the plurality of display fields.

8. The information processing method according to claim 7,
wherein the plurality of display fields include images showing items sold by the third selling user, the information processing method further comprising:
generating the web page such that the higher the one or more first similarities between the first buying user and the second buying users, the greater a number of images are included in the recommendation information.

9. The information processing method according to claim 8,
wherein an image of an item already bought by the first buying user is excluded from the recommendation information.

10. The information processing method according to claim 7, further comprising:
generating the web page such that if the one or more first similarities between the first buying user and the second buying users are the same regarding a plurality of the third selling users extracted, the numbers of the second buying users who mark a plurality of the third selling users as favorite are compared, and a second plurality of display fields of the recommendation information of the third selling users who are marked by more second buying users are displayed preferentially within the plurality of display fields.

* * * * *